United States Patent Office 2,946,052
Patented July 19, 1960

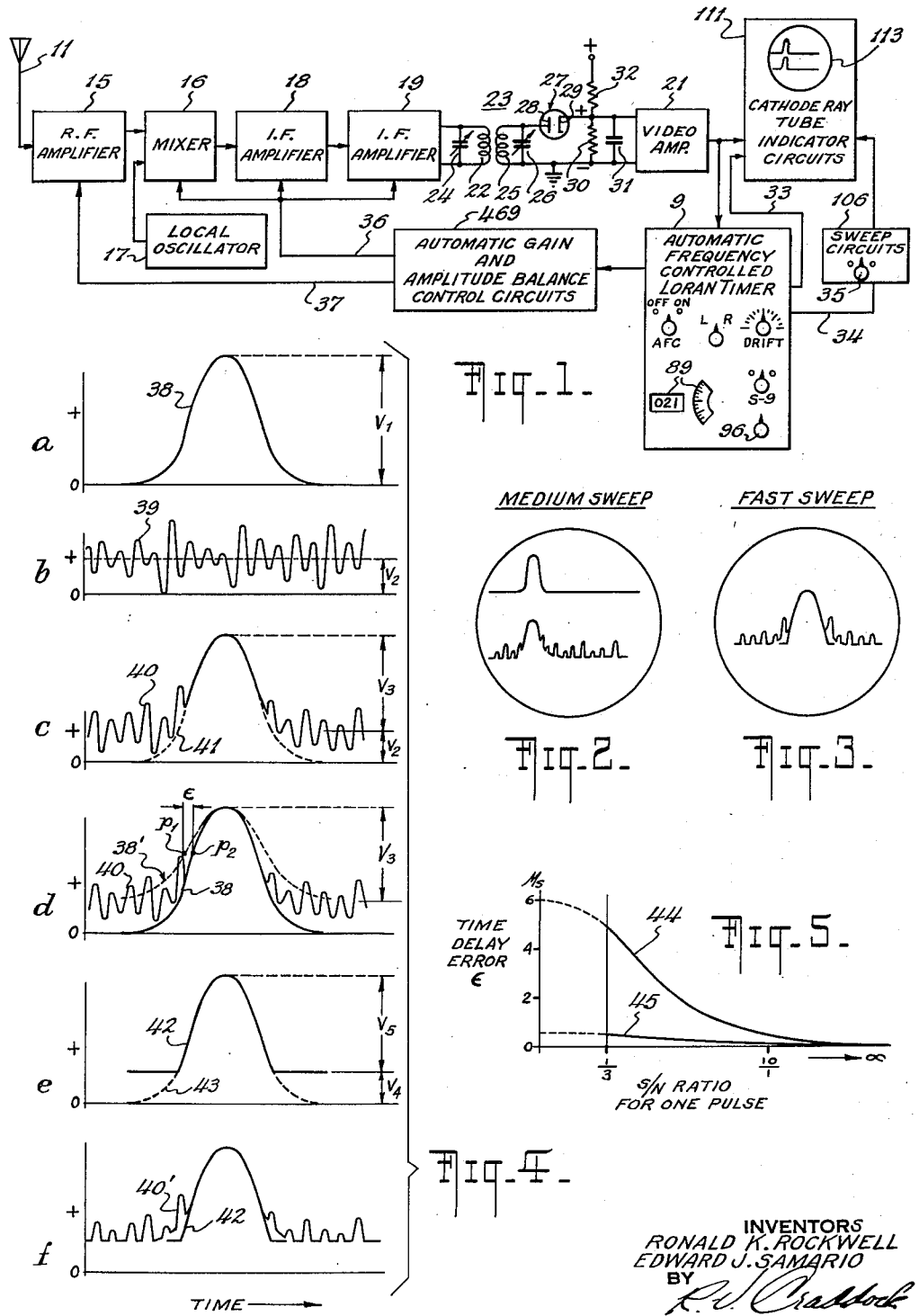

2,946,052

DETECTOR CIRCUIT FOR LORAN RECEIVERS

Ronald K. Rockwell, Yuma, Ariz., and Edward J. Samario, Hawthorne, Calif., assignors to Sperry Rand Corporation, a corporation of Delaware Filed Nov. 7, 1955, Ser. No. 545,293

8 Claims. (Cl. 343—103)

This invention relates to navigation receivers, and in particular to an improved detector circuit for a loran receiver.

The loran receiver measures the time difference interval between the arrival of recurrent A pulses from a remote master station and recurrent B pulses from a remote slave station. The time difference measurement is made by matching the detected loran A and B pulses on the face of a cathode-ray tube indicator by adjusting the starting time of the sweep voltage of the indicator under the control of a precision loran timer until the leading edges of the displayed A and B pulses appear coincident upon the face of the cathode-ray tube. The amplitudes of the detected loran A and B pulses are adjusted to be substantially equal in value by an amplitude balance control which reduces the gain of the receiver during reception of the stronger pulses. The procedure by which an operator may obtain a time difference measurement using one type of direct reading loran receiver is described in Frantz Patent 2,651,033, assigned to the same assignee as the present invention.

In adjusting the loran receiver to measure the time difference interval between the received A and B pulses, it is important that the amplitudes of the detected A and B pulses are equal when the leading edges of the A and B pulses have been adjusted to coincide. The signal-to-noise ratio of one of the received loran pulses may be considerably different from the signal-to-noise ratio of the other received loran pulse for the condition when the loran receiver is situated closer to one of the loran stations than to the other loran station. The amplitude balance control of the loran receiver reduces the gain of the receiver during the reception of the stronger loran pulses without affecting the gain during the reception of the low signal-to-noise ratio loran pulses. An error in the time difference measurement has been discovered when one of the recurrent A or B pulses has a low signal-to-noise ratio and the other recurrent pulses has a high signal-to-noise ratio. This error has been traced to the distortion of the shape of the loran pulses whose amplitudes are weak in comparison with the received noise level. This distortion of the weak loran signal is caused by suppression of the weak signal by the stronger noise voltage in the detector circuit of the receiver, especially near the weaker or leading edges of the loran pulses. A thorough treatment of the suppression of weak signals by a strong noise voltage in a detector circuit is presented in Patent 2,778,933, issued January 23, 1957, entitled "Non-Suppressing Detector Circuits" in the name of Philip W. Crist, and assigned to the same assignee as the present invention. The distortion of the leading edges of the weak loran pulses due to suppression by noise in the detector circuit causes an apparent phase lag in the detected weak loran pulses while the detected strong loran pulses remain undistorted. Thus, when the operator matches the leading edges of the low signal-to-noise ratio pulses with the leading edges of the strong signal-to-noise ratio loran pulses on the face of the cathode-ray tube indicator, an error in the measured time difference interval will result. The present invention is concerned with minimizing the effect of this time delay error.

Accordingly, the principal object of the invention is to improve the accuracy of the time difference measurement in a loran receiver for weak signal conditions.

Another object of the invention is to compensate for the effect of distortion introduced by a detector circuit in detecting a weak pulse-modulated signal in the presence of noise.

In accordance with the present invention, there is introduced an improved detector circuit for a loran receiver to which a bias voltage is applied to prevent the detector from detecting the applied pulse-modulated loran signals until the magnitude of the pulse-modulated loran signals exceeds the applied bias voltage. The value of the applied bias voltage is determined in accordance with the value of the output voltage from the detector due to noise alone in the absence of an applied bias voltage to the detector circuit. The improved detector circuit detects the strong signal-to-noise ratio loran signals with an apparent time delay which is substantially identical to the time delay introduced due to the suppression phenomenon of a detector circuit when the detector is detecting low signal-to-noise ratio loran signals.

The above objects of and the brief introduction to the present invention will be more fully understood and further objects and advantages will become apparent from a study of the following detailed description in connection with the drawings, wherein, Fig. 1 illustrates a block diagram of a loran receiver employing the improved detector circuit of this invention;

Figs. 2 and 3 illustrate the received loran A and B pulses as they appear on the face of the cathode-ray tube indicator for the medium and fast sweep-speed conditions, respectively;

Figs. 4a–4f show a series of waveforms illustrating the operation of the improved detector circuit; and Fig. 5 is a graph showing the reduction in time delay error obtained with the improved detector circuit of this invention.

Referring to Fig. 1, pulse-modulated loran A and B pulses from remote master and slave stations are collected by antenna 11 and supplied to the input of RF amplifier 15. The amplified loran signals are coupled from the output of amplifier 15 to mixer 16 where they are mixed with the output voltage from local oscillator 17 to produce an output pulse-modulated intermediate-frequency signal. The pulse-modulated I.F. signal is amplified in I.F. amplifiers 18 and 19 and supplied to the primary winding 22 of tuned I.F. transformer 23. Winding 22 and condenser 24 form a first parallel resonant circuit at the intermediate frequency. The secondary winding 25 and condenser 26 form a second parallel resonant circuit mutually coupled to the first parallel resonant circuit. A rectifier element 27 having an anode 28 and a cathode 29 is coupled in series with a load resistor 30, and the series coupled rectifier 27 and resistor 30 are coupled in shunt across the second parallel resonant circuit of winding 25 and condenser 26. The lower terminal of load resistor 30 is coupled to ground. A by-pass condenser 31 is coupled in shunt with load resistor 30 to bypass the intermediate-frequency voltage at the output of the detector circuit. A bias voltage for the detector circuit is provided by means of a dropping resistor 32 coupled between a source of positive potential and the cathode 29 of rectifier 27. This bias voltage appears as a positive voltage from cathode 29 to ground in shunt with detector load resistor 30. The detected loran pulses are amplified in video amplifier 21 and supplied to the cathode-ray tube indicator circuits 111.

The detected loran pulses from video amplifier 21 are also applied to the automatic frequency controlled loran timer 9 for automatically synchronizing the precision timing oscillator of the timer with the received loran A pulses. The automatic frequency controlled loran timer may be identical to the timer employed in the aforesaid Frantz Patent 2,651,033. The loran timer produces a square-wave trace separation voltage on lead 33 which is coupled to the vertical deflection circuits of indicator 111 for separating the A and B pulses on the face of cathode-ray tube 113 for the medium sweep-speed condition as illustrated in Fig. 2. For the fast sweep-speed condition the square-wave trace separation voltage is disconnected from the vertical deflection circuits.

The loran timer also supplies over lead 34 a first recurrent timing wave synchronized with the received A pulses for initiating the sweep circuits 106 to produce the A sweep voltage and a second variably-delayed recurrent timing wave whose time delay is under the control of switch S–9 and the time delay knob 96. The variably-delayed timing wave initiates the sweep circuits to produce the variably-delayed B sweep voltage. The A and B sweep voltages are coupled from sweep circuits 106 to the cathode-ray tube indicator circuits 111. The medium and fast sweep-speed voltages are selected by knob 35.

The automatic gain and amplitude balance control circuits 469 are also coupled to the automatic frequency control loran timer 9. These circuits produce an automatic gain control voltage on lead 36 which is supplied to the mixer 16 and the I.F. amplifiers 18 and 19, and further produces an automatic amplitude balance control voltage on lead 37 which is coupled to the R.F. amplifier 15. The gain and balance control circuits 469 are identical to the circuits shown and described in Patent 2,769,976, issued November 6, 1956, in the name of Edward Durbin, entitled "Automatic Gain and Amplitude Balance Control System for Hyperbolic Navigation Receivers," and assigned to the same assignee as the present invention.

The magnitude of the AGC voltage on lead 36 varies according to the magnitude of the weaker of the received loran A or B pulses as further explained in the aforesaid Patent 2,769,976. This AGC voltage regulates the gain of the loran receiver so that the weaker loran pulses appearing on the face of cathode-ray tube 113 will have a predetermined fixed amplitude. The AABC voltage on lead 37 does not control the gain of R.F. amplifier 15 during the reception of the weaker loran pulses but reduces the gain of the R.F. amplifier during the reception of the stronger loran pulses until the amplitude of the stronger pulses as displayed on the face of the cathode-ray tube 113 is substantially equal to the amplitude of the weaker loran pulses.

The loran receiver-indicator of Fig. 1 is adjusted to measure the time difference interval between received A and B pulses in the same manner as described in the aforesaid Frantz Patent 2,651,033. The precision timing oscillator of the timer 9 is synchronized with the received A pulses so that the recurrent A pulses appear stationary on the upper trace of the cathode-ray tube indicator as shown in Fig. 2. The received B pulses are positioned under the control of the variably-delayed timing pulses whose timing is adjusted by switch S–9 and knob 96. These timing pulses control the timing of the B sweep until the recurrent B pulses have been adjusted to appear on the lower trace of the cathode-ray tube directly below the received A pulses, as illustrated in Fig. 2. The final matching of the A and B pulses occurs during the fast sweep-speed condition when the leading edges of the B pulses are matched with the leading edges of the A pulses as illustrated in Fig. 3. The amplitudes of the A and B pulses are held substantially equal by the AABC voltage on lead 37. The time difference interval between the A and B pulses is read directly from the counter 89.

When the loran receiver is situated closer to the master transmitter than to the slave transmitter, the received A pulses will be stronger than the received B pulses. The AABC voltage on lead 37 will reduce the gain of R.F. amplifier 15 during reception of the stronger A pulses until the peak value of the detected A pulses at the output of the detector circuit is substantially equal to the peak value of the detected B pulses. With a reduced gain in the R.F. amplifier 15 during the reception of the stronger A pulses, the detector circuit including the rectifier element 27 receives very little, if any, noise. However, during the reception of the weaker B pulses when the gain of the R.F. amplifier 15 is higher, the detector circuit is responsive to both the pulse-modulated B pulses and the received random noise. During the reception of the weaker B pulses, the peak value of the pulse-modulated B pulses may exceed the peak value of the random noise while the leading edges or the weaker portions of the received B pulses may be considerably less than the peak values of the random noise.

In the aforesaid Patent 2,778,933 there is described a phenomenon which exists in a conventional detector circuit known as suppression of a weak signal by a stronger signal when both signals are simultaneously applied to a detector circuit. When the signal-to-noise ratio of the pulse-modulated A pulses applied to the detector circuit in Fig. 1 is high, the detector circuit is responsive solely to the received A pulses. The detector, however, is responsive to both pulse signals and noise during the reception of the weaker signal-to-noise B pulses. As a result, the conventional detector circuit tends to suppress the pulse-modulated B pulses near their leading edges when the strength of the leading edges is weaker than the value of the noise. During the peak value of the received B pulses when the amplitude of the pulses is stronger than the received noise, the B pulses tend to suppress the received noise.

This suppression phenomenon has been found to distort the envelope of the detected output pulses when the pulses have a low signal-to-noise ratio. This distortion phenomenon may be explained by referring to the waveforms illustrated in Fig. 4. Fig. 4a illustrates the envelope 38 of a detected pulse-modulated loran signal having a high signal-to-noise ratio as it would appear across the output of a conventional detector. The detected pulse envelope 38 has a positive peak value $V_1$. Fig. 4b illustrates the envelope of the noise voltage alone at the output of a conventional loran detector circuit. The average value of the detected noise voltage has a positive value $V_2$. Fig. 4c illustrates the output of a conventional loran detector circuit which detects a pulse-modulated loran signal in the presence of received noise. The envelope 40 of the detected pulse and noise has a positive peak value equal to the sum of $V_2$ plus the voltage $V_3$ as illustrated. The average value of the noise $V_2$ of envelope 40 has been selected to equal that of the noise voltage alone of Fig. 4b. The peak value of the envelope 40 has been selected to be equal to the peak value $V_1$ of envelope 38 of Fig. 4a. The broken-line portion 41 of Fig. 4c illustrates the leading edge of the detected loran pulse in the absence of noise.

Fig. 4c illustrates the suppression phenomenon which is present in a conventional detector circuit. Prior to the arrival of a low signal-to-noise ratio loran pulse, the conventional detector circuit produces an output noise voltage of average value $V_2$ the same as illustrated in Fig. 4b. When the value of the noise applied to the conventional detector circuit is larger than the strength of the leading edge of the applied loran pulse, the leading edge or weaker portion of the pulse is not efficiently detected by the detector circuit, the detector being responsive substantially solely to the received random noise. Thus, most of the portion of the loran pulse illustrated by the broken lines 41 which falls below the average value $V_2$ of the output noise does not appear in the output of the conventional detector circuit. When the peak portions of the loran pulse applied to the detector exceeds the value of the applied noise, these peak portions tend to suppress the received random noise. Thus, envelope 40 shows that the conventional detector circuit is substantially non-responsive to the leading edge, as well as the trailing edge, of a loran pulse which has been suppressed by the stronger noise while the peak portions of the pulse are detected in the normal manner. As a result, the leading edge of envelope 40 is delayed in time due to the presence of received noise. This delay of the leading edge distorts the true shape of the loran pulse and causes an error in the measured time difference interval between the strong signal-to-noise ratio loran A pulse and the weak signal-to-noise ratio loran B pulse.

This error in the time difference measurement is illustrated in Fig. 4d. The loran receiver in measuring the time difference interval between received A and B pulses matches both the leading edges and the peak values of the received pulses on the face of the cathode-ray tube indicator. In matching or balancing the amplitudes of a strong signal-to-noise ratio A pulse with a weak signal-to-noise ratio B pulse in a conventional loran receiver, the peak value $V_1$ of the pulse envelope 38 of Fig. 4a representing the A pulse is adjusted to equal the value $V_3$ of the pulse envelope 40 of Fig. 4c representing the weak B pulse. As previously explained, the AABC voltage reduces the gain of the loran receiver during the reception of the stronger A pulses. Thus, the strong loran pulse illustrated as the broken line envelope 38' has been attenuated from its peak value $V_1$ in Fig. 4a to a value $V_3$ in Fig. 4d, without altering the shape of the envelope. By comparing the shapes of the attenuated strong pulse represented by waveform 38' with the shape of the distorted weak pulse represented by envelope 40 it can be seen that the leading edges do not coincide due to the time delay introduced by the suppression phenomenon. Fig. 4d shows that an error $\epsilon$ exists between a selected point $P_1$ on the leading edge of the attenuated strong loran pulse 38' and a corresponding point $P_2$ on the leading edge of the distorted weaker loran pulse 40.

The time delay error $\epsilon$ illustrated in Fig. 4d has been exaggerated for purposes of illustration. It is this error which the present invention minimizes. By providing a back-bias voltage in series with the rectifier element 27 of the detector circuit of Fig. 1, the rectifier will not detect the received loran pulses until the amplitude of the pulse-modulated signal applied to the detector circuit exceeds the magnitude of the back-bias voltage. The effect of the back-bias voltage upon the detected pulse-modulated loran pulses is illustrated in Fig. 4e. The output voltage across the detector load resistor 30 is equal to the back-bias voltage $V_4$ in the absence of applied pulse signals or noise. A strong amplitude-modulated loran pulse applied to the detector circuit of the present invention produces an output pulse envelope 42 as illustrated in Fig. 4e. The leading edge portion 43, as well as the corresponding trailing edge portion of the strong loran pulse is not detected by the circuit until the pulse exceeds the amplitude of the applied back-bias voltage across load resistor 30. When the value of the back-bias voltage $V_4$ is selected approximately equal to the average value $V_2$ of the output noise voltage from a conventional second detector, the shape of envelope 42 of a detected strong signal is very nearly identical to the envelope 40 of a detected weak loran pulse in the presence of received noise. The back-bias voltage across load resistor 30 has little or no effect upon the detection of applied weak loran pulses in the presence of received noise.

In matching a detected strong pulse at the output of the detector circuit of Fig. 1 with a detected weak pulse in the presence of noise, the AABC voltage on lead 37 controls the gain of the R.F. amplifier 15 until the magnitude $V_5$ of the strong pulse 42 is substantially equal to the magnitude $V_3$ of the weaker loran pulse 40. The output pulse envelopes 40' and 42 from the detector circuit are compared in Fig. 4f to show that the leading edges of these pulses more nearly coincide when a suitable back-bias voltage has been employed in the detector circuit than would be the case if a conventional loran detector were employed. The back-bias voltage has caused the detector circuit of Fig. 1 to introduce a distortion in the detection of a strong loran pulse which is very similar to the distortion which occurs when a detector detects a weak loran pulse in the presence of received noise. Thus, the leading edge of envelope 42 of Fig. 4f coincides more closely with the leading edge of envelope 40' for the improved detector circuit of Fig. 1 than exists in the prior loran detector circuits.

The reduction in the time delay error $\epsilon$ which has been achieved by the improved detector circuit of this invention is illustrated by the graph of Fig. 5. In this graph the abscissa represents the signal-to-noise ratio for one of the received loran A or B pulses when the signal-to-noise ratio for the other pulse is very large. The time delay error $\epsilon$ is approximately five microseconds when the weak loran pulse has a signal-to-noise ratio equal to one-third and a conventional detector circuit is employed as illustrated by curve 44. For the same signal-to-noise ratio condition, the time delay error may be reduced to less than one microsecond when the improved detector circuit of the present invention is employed as illustrated by curve 45.

The back-bias voltage on the detector of Fig. 1 does not affect the time difference measurement between the received loran A and B pulses when both pulses are strong in the presence of noise since both pulses are detected in the same manner and have the same pulse shape. This is also true when both A and B pulses have a weak signal-to-noise ratio.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a loran receiver, a detector circuit comprising in combination, an input circuit for receiving pulse-modulated loran signals to be detected, a rectifier element coupled to said input circuit for rectifying said pulse-modulated loran signals, a load impedance coupled to said rectifier element across which said rectified loran pulses are produced, and means including a source of bias voltage coupled to said rectifier element for biasing said rectifier element in a direction to prevent rectification of said pulse-modulated signals until the magnitude of said pulse-modulated signals exceeds the magnitude of the bias voltage, the magnitude of said bias voltage being determined according to the average value of the output voltage across said load impedance due to the rectification of noise alone.

2. In a loran receiver, a detector circuit comprising in combination, a parallel resonant input circuit inductively coupled to a source of pulse-modulated loran signals to be detected, a rectifier element, a load impedance coupled in series with said rectifier element, said series coupled rectifier element and load impedance coupled in shunt across said input circuit, and means for providing a bias voltage for biasing said rectifier element in a direction to prevent rectification of said pulse-modulated loran signals until the magnitude of said pulse-modulated signals exceeds the magnitude of the bias voltage, the magnitude of said bias voltage being determined according to the average value of the rectified output voltage across said load impedance due to noise alone when no bias voltage is supplied to said rectifier element.

3. A loran receiver responsive to recurrent A pulses radiated from a master station and to recurrent B pulses radiated from a slave station, the strength of one of said recurrent pulses being strong in the presence of received noise, the strength of the other of said recurrent pulses being of the same order of magnitude as the received noise, comprising in combination, antenna means for collecting the radiated A and B pulse signals from said master and slave stations, amplifier means coupled to said antenna means for amplifying said A and B pulse signals, detector means coupled to the output of said amplifier means, said detector means including an input circuit for receiving said amplified pulse-modulated loran signals and noise to be detected, a rectifier element coupled to said input circuit for rectifying said pulse-modulated signals and noise, a load impedance coupled to said rectifier element across which said rectified pulses and noise are produced, cathode-ray tube indicator means coupled to the output of said detector means for displaying the rectified A and B pulses and noise, means coupled to the output of said detector means and responsive to the relative strengths of said rectified A and B pulses for producing an amplitude balance control voltage whose magnitude varies according to the difference in relative strengths between said rectified A and B pulses and whose phase is determined by the stronger of said received A and B pulses, means coupling said amplitude balance control voltage to said amplifier means for reducing the gain of said amplifier means during the reception of the stronger of said A or B pulses, and means providing a bias voltage for biasing said rectifier element in a direction to prevent rectification of said pulse-modulated A and B pulses until the magnitudes of said pulses exceed the magnitude of the bias voltage, the magnitude of the bias voltage being determined according to the average value of the rectified output voltage across said load impedance due to received noise alone.

4. In a pulse receiver, a detector circuit comprising in combination, an input circuit for receiving pulse-modulated signals to be detected, said input circuit also receiving random noise voltages, a rectifier element coupled to said input circuit for rectifying said pulse-modulated signal and noise voltages, an output circuit coupled to said rectifier element for producing detected output pulse and noise voltages, and a source of direct voltage coupled to said rectifier element, said direct voltage biasing said rectifier element to prevent rectification of said pulse-modulated signals until the magnitude of said signals exceeds the magnitude of said direct bias voltage, the magnitude of said direct bias voltage being determined according to the average value of said received random noise voltages.

5. A detector circuit for detecting a first recurrent pulse-modulated carrier wave during first time intervals having a strong signal-to-noise ratio and said second recurrent wave and a second recurrent pulse-modulated carrier wave during second time intervals, said first recurrent wave having a weak signal-to-noise ratio, comprising in combination, an input circuit for receiving said first and second recurrent pulse-modulated waves, a rectifier element coupled to said input circuit, an output circuit coupled to said rectifier element, and means providing a direct voltage coupled to said rectifier element for biasing said rectifier element to prevent rectification of said pulse-modulated waves until the magnitude of said pulse-modulated waves exceeds the magnitude of said direct bias voltage, the magnitude of said direct bias voltage being determined according to the average value of the rectified noise at the output circuit of said detector circuit during said second time intervals.

6. In a loran receiver responsive to recurrent A pulses radiated from a master station and to recurrent B pulses radiated from a slave station, apparatus comprising controllable means for amplifying the received A and B pulses, said amplifying means being adapted to receive a control voltage for normalizing the amplitude of both said A and B pulses at the output of said amplifying means, detector means coupled to the output of said amplifying means, said detector means including an input circuit for receiving said controllably amplified A and B pulses and noise to be detected, a rectifier element coupled to said input circuit for rectifying said A and B pulses and noise, a load impedance coupled to said rectifier element across which said rectified pulses and noise are produced, and means providing a voltage for biasing said rectifier element in a direction to prevent rectification of said A and B pulses until the magnitudes of said pulses exceed the magnitude of the bias voltage, the magnitude of the bias voltage being determined according to the average value of the rectified output voltage across said load impedance due to received noise alone.

7. In a loran receiver responsive to recurrent A pulses radiated from a master station and to recurrent B pulses radiated from a slave station, apparatus comprising means for controllably amplifying the received A and B pulses, detector means coupled to the output of said amplifying means, said detector means including an input circuit for receiving said amplified A and B pulses and noise to be detected, a rectifier element coupled to said input circuit for rectifying said A and B pulses and noise, a load impedance coupled to said rectifier element across which said rectified pulses and noise are produced, means coupled to the output of said detector means and responsive to the absolute strength of a predetermined one of said rectified A and B pulses for producing a gain control voltage, means coupled to the output of said detector means and responsive to the relative strength of said rectified A and B pulses for producing an amplitude balance control voltage, means for applying said gain control voltage and said amplitude balance control voltage to said amplifying means for normalizing the amplitude of both said A and B pulses at the output of said amplifying means, and means providing a voltage for biasing said rectifier element in a direction to prevent rectification of said A and B pulses until the magnitudes of said pulses exceed the magnitude of the bias voltage, the magnitude of the bias voltage being determined according to the average value of the rectified output voltage across said load impedance due to received noise alone.

8. In a loran receiver responsive to recurrent A pulses radiated from a master station and to recurrent B pulses radiated from a slave station, apparatus comprising in combination first and second cascaded amplifying means for amplifying the received A and B pulses, detector means coupled to the output of said cascaded amplifying means, said detector means including an input circuit for receiving said amplified A and B pulses and noise to be detected, a rectifier element coupled to said input circuit for rectifying said A and B pulses and noise, a load impedance coupled to said rectifier element across which said rectified pulses and noise are produced, means coupled to the output of said detector means and responsive to the absolute strength of the weaker of said rectified A and B pulses for producing a gain control voltage, means for applying said gain control voltage to said first amplifying means to regulate the gain thereof so that the amplitude of said weaker loran pulse assumes a predetermined fixed amplitude, means coupled to the output of said detector means and responsive to the relative strength of said rectified A and B pulses for producing an amplitude balance control voltage whose amplitude varies according to the difference in strength between said rectified A and B pulses, means for applying said amplitude balance control voltage to said second amplifying means for reducing the gain thereof during the reception of the stronger of said A and B pulses, and means providing a voltage for biasing said rectifier element in a direction to prevent rectification of said A and B pulses until the magnitudes of said pulses exceed the magnitude of the bias voltage, the magnitude of the bias voltage being determined according to the average value of the rectified output voltage across said load impedance due to received noise alone.

References Cited in the file of this patent

UNITED STATES PATENTS

| | | |
|---|---|---|
| 2,373,604 | Wallace | June 19, 1945 |
| 2,651,033 | Frantz | Sept. 1, 1953 |
| 2,794,911 | Rosier | June 4, 1957 |

FOREIGN PATENTS

| | | |
|---|---|---|
| 459,568 | Great Britain | Jan. 11, 1937 |
| 493,394 | Canada | June 2, 1953 |